US 11,280,485 B2

(12) United States Patent
Paris et al.

(10) Patent No.: US 11,280,485 B2
(45) Date of Patent: Mar. 22, 2022

(54) INTERACTIVE DEVICE HAVING MODULAR ILLUMINATED COMPONENTS

(71) Applicants: Nicholas Paris, San Pedro, CA (US); Erika Kane Paris, San Pedro, CA (US)

(72) Inventors: Nicholas Paris, San Pedro, CA (US); Erika Kane Paris, San Pedro, CA (US)

( * ) Notice: Subject to any disclaimer, the term of this patent is extended or adjusted under 35 U.S.C. 154(b) by 189 days.

(21) Appl. No.: 16/660,935

(22) Filed: Oct. 23, 2019

(65) Prior Publication Data
US 2020/0124262 A1    Apr. 23, 2020

Related U.S. Application Data

(60) Provisional application No. 62/748,700, filed on Oct. 22, 2018.

(51) Int. Cl.
| F21V 23/04 | (2006.01) |
| A63H 33/22 | (2006.01) |
| H05B 45/20 | (2020.01) |
| F21V 23/00 | (2015.01) |
| F21V 9/40 | (2018.01) |
| G02B 3/00 | (2006.01) |
| B29D 11/00 | (2006.01) |

(52) U.S. Cl.
CPC .......... *F21V 23/007* (2013.01); *A63H 33/22* (2013.01); *B29D 11/00365* (2013.01); *F21V 9/40* (2018.02); *F21V 23/0485* (2013.01); *G02B 3/00* (2013.01)

(58) Field of Classification Search
CPC ...... A63H 3/00; A63H 33/22; H05B 37/0272; H05B 37/0227; H05B 37/0218; H05B 33/0815; H05B 33/0809; H05B 33/0818; H05B 45/10; H05B 45/14; H05B 45/20; H05B 45/125; H05B 45/325; H05B 47/11; H05B 47/12; H05B 47/105; F21V 23/007; F21V 23/0485; F21V 9/40; G06F 1/163; G06F 1/1652
See application file for complete search history.

(56) References Cited

U.S. PATENT DOCUMENTS

| 4,858,079 | A | * | 8/1989 | Ohashi | F21V 33/008 |
| | | | | | 353/62 |
| 5,114,376 | A | * | 5/1992 | Copley | A63H 3/006 |
| | | | | | 446/485 |
| 5,816,885 | A | * | 10/1998 | Goldman | A63H 3/28 |
| | | | | | 446/302 |
| 5,830,034 | A | * | 11/1998 | Ciechanowski | A63H 33/22 |
| | | | | | 362/186 |
| 5,888,117 | A | * | 3/1999 | Sutton | A63H 3/003 |
| | | | | | 40/410 |
| 6,165,037 | A | * | 12/2000 | Van Zant | A63H 3/006 |
| | | | | | 446/485 |

(Continued)

*Primary Examiner* — Abdullah A Riyami
*Assistant Examiner* — Syed M Kaiser
(74) *Attorney, Agent, or Firm* — The Rapacke Law Group P.A.

(57) ABSTRACT

An interactive luminary device comprising a housing including at least one interactive luminary device. A plurality of sensors are in operable communication with the at least one interactive luminary device. Each sensor is in communication with a programmable logic controller configured to analyze a stimulus provided by a user and generate a response stimulus.

20 Claims, 5 Drawing Sheets

(56) References Cited

U.S. PATENT DOCUMENTS

| | | | | |
|---|---|---|---|---|
| 6,253,058 B1* | 6/2001 | Murasaki | A63H 3/28 | 446/175 |
| 6,544,094 B1* | 4/2003 | Maddocks | A63H 3/365 | 446/337 |
| 6,997,772 B2* | 2/2006 | Fong | A63H 3/006 | 446/175 |
| 7,329,035 B2* | 2/2008 | Feliciano | G03B 21/145 | 40/442 |
| 8,052,502 B2* | 11/2011 | Connolly | A63H 3/02 | 446/485 |
| 9,557,037 B1* | 1/2017 | Gramelspacher | A63H 3/006 | |
| 10,302,290 B2* | 5/2019 | Sutton | A63H 3/006 | |
| 10,335,697 B2* | 7/2019 | Villano | A63H 33/22 | |
| 2003/0168811 A1* | 9/2003 | Gerson | F41J 5/056 | 273/372 |
| 2004/0067713 A1* | 4/2004 | Fong | A63H 3/006 | 446/175 |
| 2006/0002110 A1* | 1/2006 | Dowling | F21K 9/00 | 362/249.05 |
| 2007/0060020 A1* | 3/2007 | Civettini | A63H 33/22 | 446/484 |
| 2008/0147239 A1* | 6/2008 | Chiang | B25J 13/084 | 700/264 |
| 2008/0194175 A1* | 8/2008 | Last | G06F 3/002 | 446/302 |
| 2009/0015793 A1* | 1/2009 | Suzuki | G03B 21/10 | 353/19 |
| 2010/0041312 A1* | 2/2010 | King | A63H 33/22 | 446/484 |
| 2010/0097448 A1* | 4/2010 | Gilbert | G09G 5/36 | 345/82 |
| 2010/0296370 A1* | 11/2010 | Holmes | G04F 1/005 | 368/73 |
| 2011/0001892 A1* | 1/2011 | Gay | A63H 3/28 | 348/836 |
| 2011/0269374 A1* | 11/2011 | Hornsby | A63H 18/16 | 446/484 |
| 2012/0315820 A1* | 12/2012 | Goff | A63H 3/28 | 446/297 |
| 2013/0331000 A1* | 12/2013 | Drozdowski | A63H 3/02 | 446/369 |
| 2015/0283470 A1* | 10/2015 | Hooper | H02J 50/12 | 446/485 |
| 2016/0001192 A1* | 1/2016 | Wang | A63H 33/22 | 446/396 |
| 2016/0041581 A1* | 2/2016 | Piccionelli | G02F 1/133305 | 345/156 |
| 2016/0364560 A1* | 12/2016 | Yan | G06F 21/32 | |
| 2017/0189640 A1* | 7/2017 | Sadwick | H05B 45/20 | |
| 2017/0221450 A1* | 8/2017 | Kim | G06F 1/1626 | |
| 2018/0187876 A1* | 7/2018 | Sutton | F21V 23/04 | |
| 2018/0220506 A1* | 8/2018 | Sadwick | H05B 47/18 | |
| 2018/0279429 A1* | 9/2018 | Sadwick | H05B 45/3725 | |
| 2019/0141823 A1* | 5/2019 | Mason | H04M 1/72412 | |
| 2020/0033100 A1* | 1/2020 | Hong | F41J 3/0009 | |
| 2020/0037419 A1* | 1/2020 | Scott | H05B 45/60 | |
| 2020/0053868 A1* | 2/2020 | Park | H05K 1/0213 | |
| 2020/0107434 A1* | 4/2020 | Lee | H05K 1/18 | |

* cited by examiner

INTERACTIVE DEVICE HAVING MODULAR ILLUMINATED COMPONENTS

CROSS-REFERENCE TO RELATED APPLICATIONS

The present application claims priority to U.S. Provisional Application No. 62/748,700 filed on Oct. 22, 2018, entitled "INTERACTIVE LUMINARY DEVICE" the entire disclosure of which is incorporated by reference herein.

FIELD

The embodiments provided are directed toward toys, and in particular, to illuminated toys which are able to project patterns of light.

BACKGROUND

Interactive children's toys are thought to be more effective in captivating the attention of the child in comparison to static unimodal toys. These interactive toys aid in the development of interactive skills between the child and their environment.

Currently there are a plurality of children's toys on the market today which have incorporated light sources to project an image from the device onto its surroundings. While this concept is well known in the arts, its implementation is often configured into an expensive and complex device that is part of a substantial and large device. Often, these devices are fragile and not well suited for the rigors of children's play. Consequently, these devices are easily damaged, with the result being that the device is no longer functional or safe for use. Additionally, many such projection devices known in the arts use a fixed light source which limits the possible play patterns and creates little motivation for users to interact with the toy.

Room for improvement exists for modular toys that permit the user to select from a plurality of LED functions as well as pivoting the light source and light-emitting components. Glasses, night lights, or projectors can have many complex features, however they are extremely expensive and not necessarily suitable for a fidget-type toy. In the example of a night light or projector, the device is typically constructed to be stationary or only moved and modulated during periods where the device is not in use. These toys also do not change upon bouncing, spinning, or pivoting as is performed by the device of the present invention.

SUMMARY OF THE INVENTION

The embodiments described herein provide for an interactive luminary device comprising a housing including at least one interactive luminary device. A plurality of sensors are in operable communication with the at least one interactive luminary device. Each sensor is in communication with a programmable logic controller configured to analyze a stimulus provided by a user and generate a response stimulus.

The device allows for an interactive luminary device to be positioned on or disposed within various axillary devices such as a children's toy, beach ball, light source, or other auxiliary device. The interactive luminary device provides a means for engaging the user and providing a response to various stimuli received from the user.

In one aspect, the visual stimulus is displayed on a translucent surface positioned on the decorative housing or the at least one interactive element.

In one aspect, the at least one interactive element is a flexible membrane hermetically sealed to the decorative housing.

In one aspect, a pressure sensor is disposed within the hermetically sealed flexible membrane to monitor pressure changes. Upon a change in pressure, the programmable logic controller generates the output signal to generate the response stimulus.

In another aspect, the programmable logic controller is provided with a plurality of pre-programmed sequences. The stimulus can include a touch, a sound, a vibration, or a pressure to the flexible base. Preprogrammed sequences may include response stimuli having a plurality of colors, light intensities, patterns, and timing of each.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

The specific details of the single embodiment or variety of embodiments described herein are set forth in this application. Any specific details of the embodiments are used for demonstration purposes only and no unnecessary limitation or inferences are to be understood therefrom.

Before describing in detail exemplary embodiments, it is noted that the embodiments reside primarily in combinations of components related to the system. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the invention described herein relates to a device 100 configured as a children's toy that illuminates an outer surface with various colors and patterns. These colors and patterns can be changed, distorted, animated, or altered in response to a stimulus by a user.

The device is comprised of a translucent cover 236 positioned over an outer dome and inner dome. Each dome is affixed to a base and nested atop one another. The translucent cover protects the outer dome and inner dome as well as internal components from dust, debris, and damage.

The base surface has a power switch and member permitting the user to pivot the internal components of the device.

Figure 1:
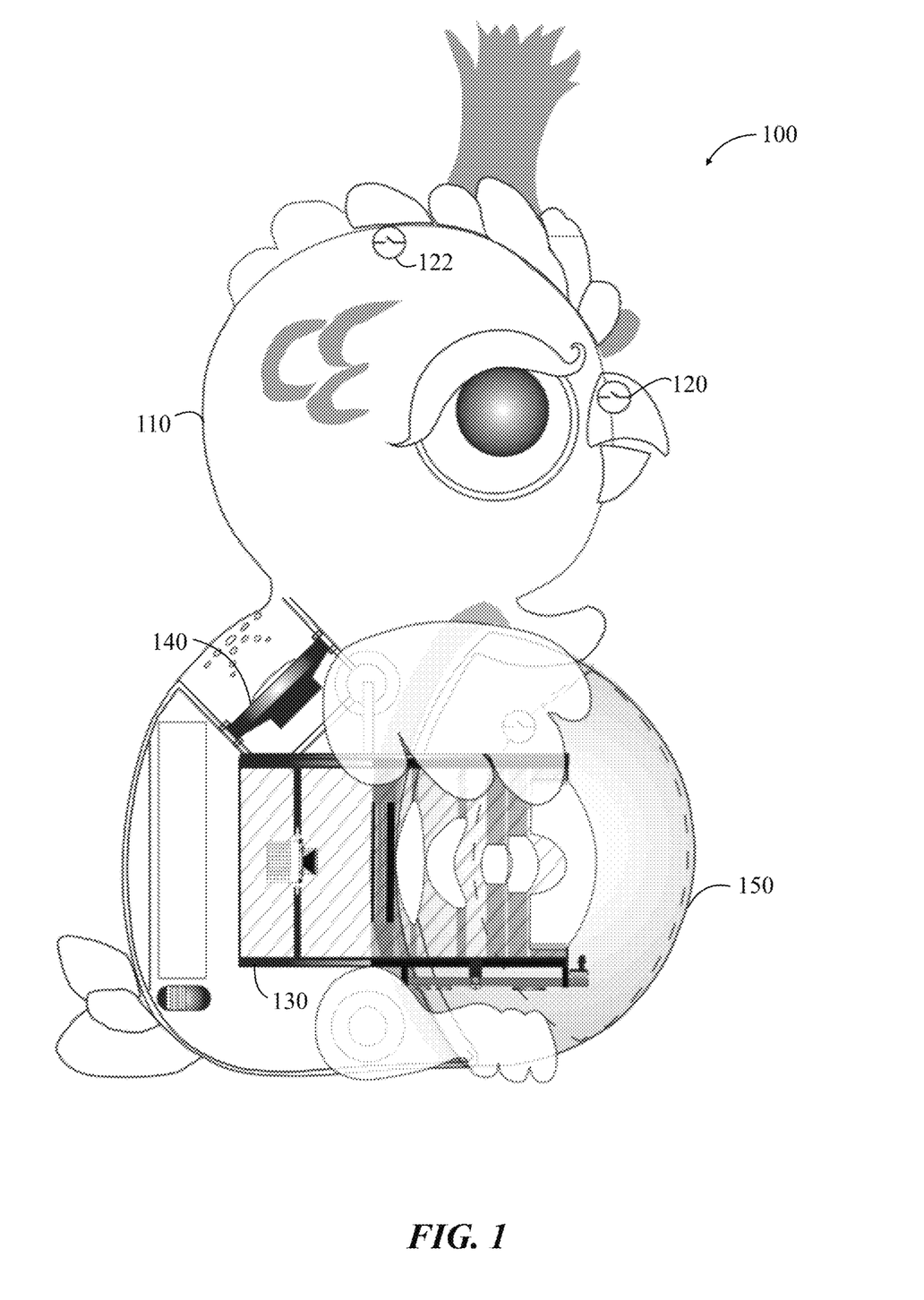
FIG. 1 illustrates a side elevation view of the interactive luminary device positioned on a housing, according to an embodiment of the present invention.

FIG. 1 illustrates an exemplary device 100 including a housing 110 having a plurality of sensors 120 embedded therein. The plurality of sensors 120, 122 can include, for example, pressure sensors, motions sensors, proximity sensors, infrared (IR) sensors, resistance sensors, capacitance sensors, magnetic sensors, laser tracking sensors, among other sensors known in the arts. A display system 130 generates a visual stimulus to be displayed to the user during use. In some embodiments, a speaker 140 can be disposed on or within the housing to transmit an audio stimulus to the user. A flexible membrane 150 is configured as an interactive surface, such that stimulus generated by the user is received and transmitted to a control system. The flexible membrane 150 facilitates the transmittal of visual stimulus to the user which may be arbitrary or generated in response to the user stimulus.

In some embodiments, the flexible membrane may include regions restricting light to be emitted from translucent regions. The translucent regions may be formed as a pattern, object, or similar indicator. The flexible membrane may be constructed with an opaque and/or transparent photomask to alter the brightness of the light emitted therethrough.

The flexible membrane, although illustrated as a semi-dome, may instead be configured of any geometric shape. In various examples, the flexible membrane may be spherical, hexagonal, or conical. In an alternate embodiment, the flexible membrane is removably engaged such that the flexible membrane can be changed, replaced, or modulated as deemed useful or entertaining by the user.

In an alternate embodiment, the flexible membrane may include printing, engraving, coloring, textures, 3-dimensional or 2-dimensional shapes, or other modifications.

The power switch may be configured as a multi-position ON/OFF switch permitting the user to select from a plurality of operating modes. This may include a constitutive ON function, random operation, or preprogrammed operation in response to a stimulus. A stimulus may include a movement, sound, vibration, touch, or other similar manipulation the device or environment.

In one example, a preferred embodiment includes a primary operating mode whereby the light source cycles through a preprogrammed color and brightness sequence while the user is manipulating and flexible the device. When manipulation is ceased, the light source is cycled to OFF after a preprogrammed period of time. The device will continue to respond to manipulation until the ON/OFF switch is switched to the OFF position.

Upon the user turning the device to the ON setting, a preprogrammed start-up sequence may be performed, giving a visual cue to the user that the device is now turned on and operational. Similar indicating settings may be preprogrammed, such as a sequence to indicate a low battery or a full charge of the battery.

A light source is positioned at a central point within each dome. The light source is preferably a plurality of LED's in electrical communication with a power source.

In some embodiments, the housing may be configured as an auxiliary device, such as a children's toy, interactive device, sports equipment, or other device with which the interactive luminary device may be engaged. The interactive luminary device may be embedded at least partially within the housing, as shown in FIG. 1, or may be positioned on a surface of the housing to permit the user to engage with the interactive luminary device. For example, the housing may be a beach ball configured to receive the interactive luminary device within the interior of the beach ball. The interactive luminary device may then emit light through the surface of the beach ball.

Figure 2:
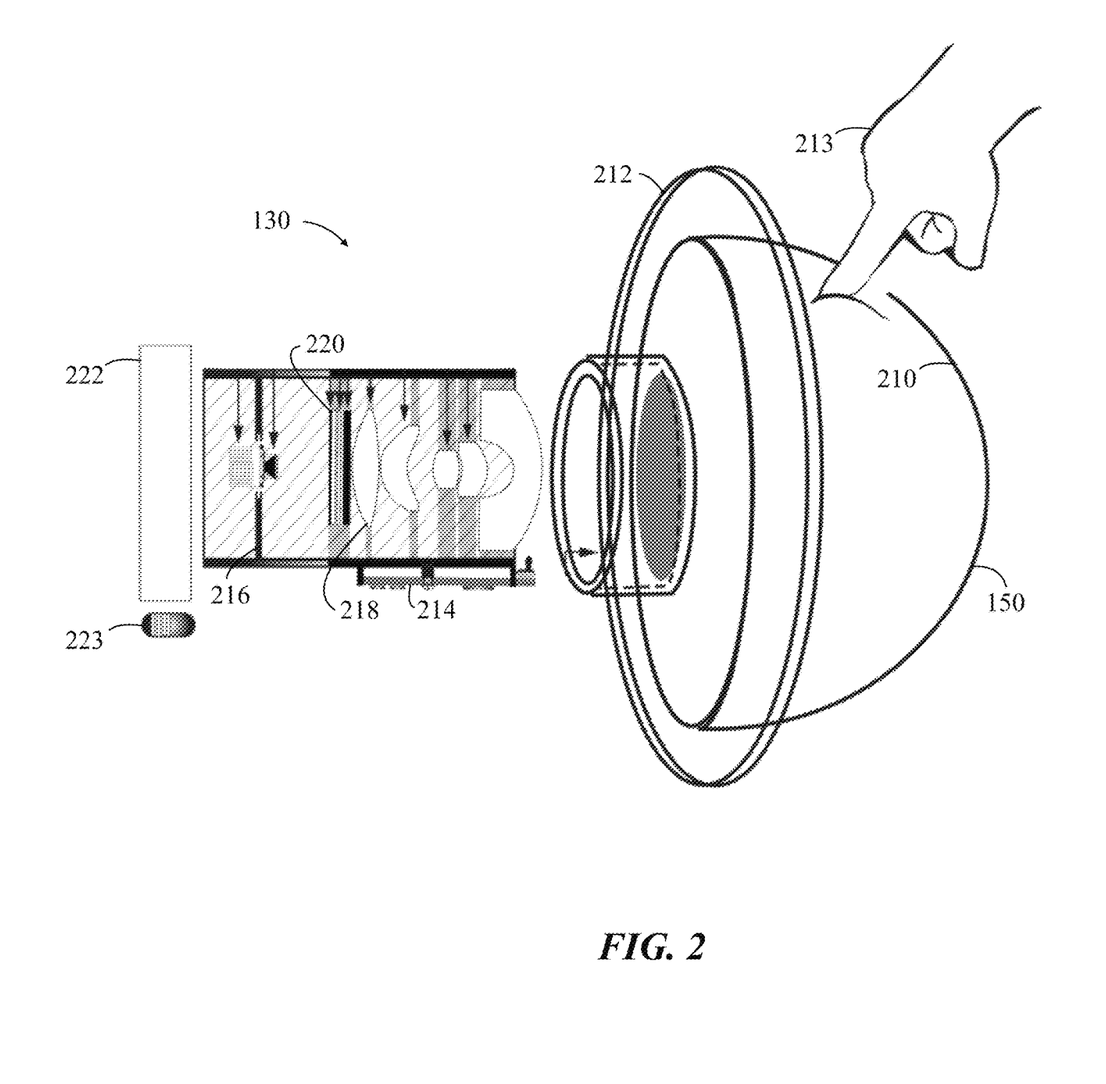
FIG. 2 illustrates a schematic of the interactive luminary device and display system, according to an embodiment of the present invention.
Figure 3:
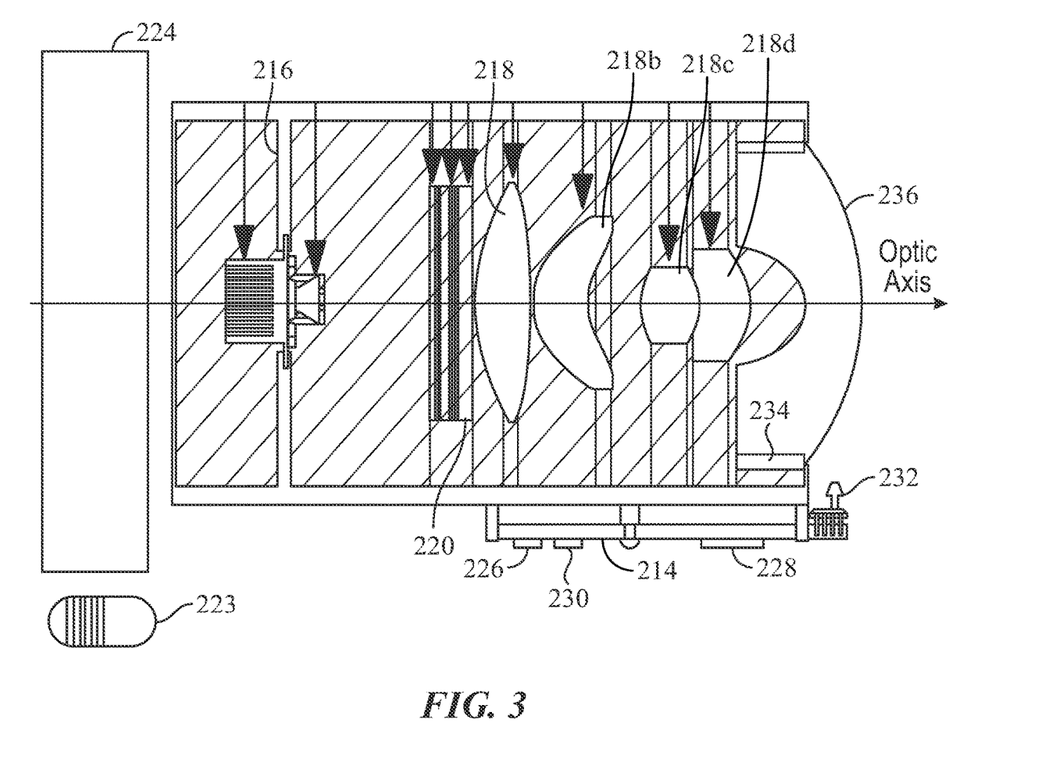
FIG. 3 illustrates a schematic of the display system, according to an embodiment of the present invention.

FIG. 2 and FIG. 3 illustrate an exemplary schematic of the display system 130. The flexible membrane 150 includes a diffused viewing surface 210 arranged on the outer surface. A flexible membrane protrusion 212 is configured as an annular ring about the perimeter of the semispherical flexible membrane 150. The display system is disposed within an inner cavity formed between the flexible membrane 150 and the housing once engaged with one another. The display system 130 includes a printed circuit board (PCB) 214, in communication with a light array display 216, lens 218, and LCD display 220. A power source 222 provides suitable energy to the display system 130 and sensors 120. The output of power from the power source 222 may be controlled by an ON/OFF switch 223.

In some embodiments, the PCB is in operable communication with a display driver, microcontroller, audio player, and a power supply.

While the example of an LCD is provided, any suitable light source can be utilized such as, for example an OLED, LCOS, MicroLED, DLP projector, laser, or optical phase array (OPA). The light source may be powered by a battery provided at a projector or by a battery or other power source connected to a projector.

In some embodiments, the power source may be a solar cell or a solar power-based device such as a thin film voltaic panel or the like that is provided on an exterior surface of the projector or otherwise mounted for exposure to the sun or light sources.

In reference to FIG. 2, a primary lens projects the image received from the LED 220 onto the interior surface of the flexible membrane 150 which is diffused through the semi-translucent surface, remaining visible to the user. The power switch 233 may be configured as a multi-position ON/OFF switch permitting the user to select from a plurality of operating modes. This may include a constitutive ON function, random operation, or preprogrammed operation in response to a stimulus. A stimulus may include a movement, sound, vibration, touch, or other similar manipulation the device or environment.

In one example an operating mode is programmed on the PCB. The operating mode can include, by way of example, the LED cycling through a preprogrammed color and brightness sequence while the user is stimulating the flexible membrane of the device. When stimulus is ceased, the light source may be cycled to OFF after a preprogrammed period of time. The device will continue to respond to stimuli until the ON/OFF switch is switched to the OFF position.

In some embodiments, upon the user turning the device to the ON setting, a preprogrammed start-up sequence may be performed, giving a visual cue to the user that the device is now turned on and operational. Similar indicating settings may be preprogrammed, such as a sequence to indicate a low battery or a full charge of the battery.

To avoid the use of mechanical drives and expensive materials, the LED is preferentially one or more LED's electrically connected to a solid-state PCB which includes instructions for various colors, sequences, brightness, blinking patterns, or likewise settings of the LED.

In alternate embodiments, other high-efficiency light sources may be utilized including one or more lasers, LCD devices, among other light sources known in the arts. Any of the potential light sources may be preprogrammed as a photographic display, holographic display, lenticular display, prismatic display, or likewise display effect.

The device described herein may be incorporated into various housings such as dolls, furniture, clothing, children's toys, structures, household items, or along with other devices functioning in unison or individually.

In further reference to FIG. 2, the user 213 is pressing on the flexible membrane to cause a response stimulus. The response stimulus can include one or more stimuli including lights, sounds, or tactile feedback.

Figure 4:
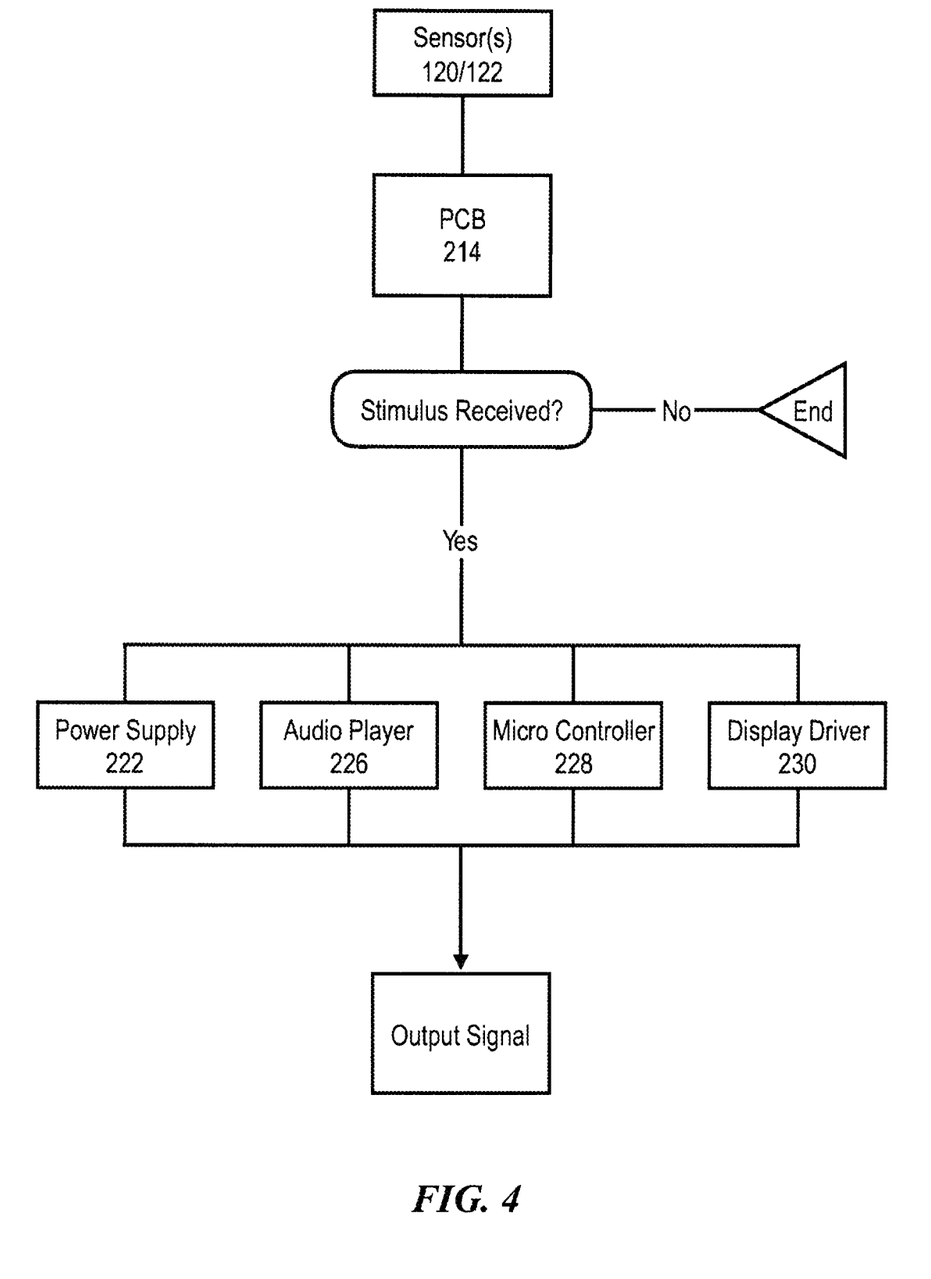
FIG. 4 illustrates a block diagram of the stimulus interpretation and response system, according to an embodiment of the present invention.

FIG. 4 illustrates a block diagram of the process for receiving a stimulus via the sensors and generating an output signal which results in a response stimulus the user can see, feel, hear, or otherwise experience. In some embodiments, the PCB 214 is in operable communication with a power supply 222, audio player 226, microcontroller 228, and a display driver 230. Each sensor 120 is in communication with the PCB 214. In the present embodiment, a pressure sensor 232 and pressure sensor tube 234 are configured to sense pressure changes within the flexible membrane 150. The speaker 140 is in communication with the PCB 214 and audio player 216 to transmit auditory signals arbitrarily or in response to stimuli.

Figure 5:
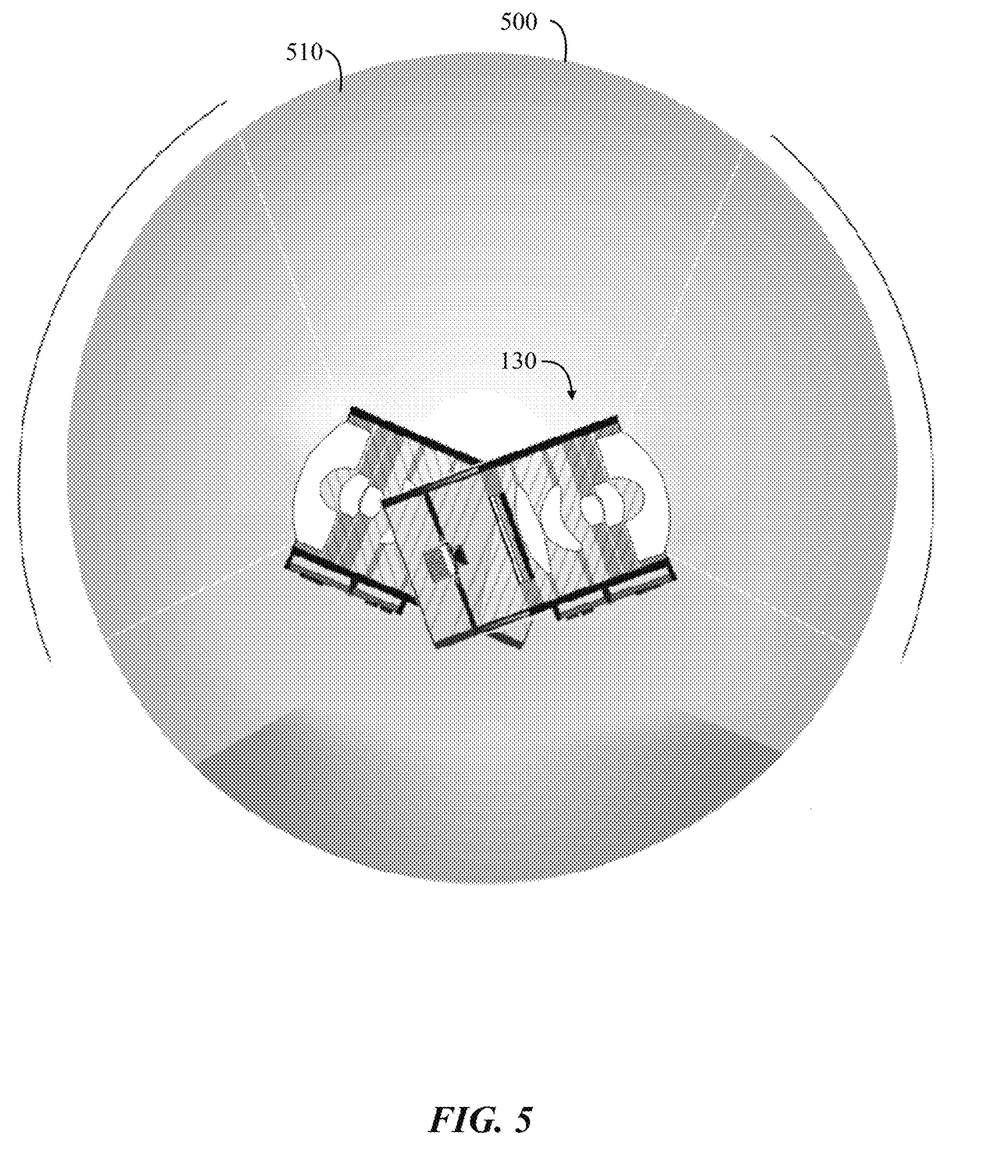
FIG. 5 illustrates a top elevation view of the interactive luminary device disposed within a protective housing, according to some embodiments.

FIG. 5 illustrates the display system 130 disposed within the interior cavity 510 of a protective housing 500. The protective housing 500 may be comprised of a transparent or semi-transparent surface to allow for light to be emitted therethrough. The protective housing 500 may be waterproof to allow the display system 130 to be at least partially submerged in water or in another medium which may be hazardous to the display system 130.

To avoid the use of mechanical drives and expensive materials, the light source is preferentially one or more LED's electrically connected to a solid-state PCB. The PCB has instructions for various colors, blinking patterns, or similar settings of the LED.

While an embodiment for a children's toy is utilized by example, the device may also be configured as a fidget toy, therapy device, light sculpture, or art piece.

The flexible membrane, although illustrated as a semi-dome, may instead be configured of any geometric shape. In various examples, the domes may be spherical, hexagonal, or conical. In an alternate embodiment, each dome is removably engaged such that the domes can be changed, replaced, or modulated as deemed useful or entertaining by the user.

In an alternate embodiment, the flexible membrane may include printing, engraving, coloring, textures, 3-dimensional or two-dimensional shapes, or other modifications.

The flexible membrane may be constructed of PVC, silicone, plastic, rubber, leather, or any other suitable flexible material and/or combination thereof. The membrane may then be securely attached, co-molded, or otherwise affixed to the translucent cover of the device. In a preferred embodiment, the membrane is integral with the translucent cover to seal the inner components therein.

In one embodiment, flexible membrane permits the user to rotate or pivot the light source by twisting the member within the flexible membrane or applying pressure to the membrane during use.

A controller in operable communication with the PCB may include a plurality of pre-programmed instructions for flashing, animation, color patterns, sequences, timing, and light intensity among other settings commonly utilized with LED lights.

In alternate embodiments, other high-efficiency light sources may be utilized including one or more lasers, LCD devices, among other light sources known in the arts. Any of the potential light sources may be preprogrammed as a photographic display, holographic display, lenticular display, prismatic display, or likewise display effect.

The device described herein may be incorporated into auxiliary devices such as dolls, furniture, clothing, children's toys, structures, household items, or along with other devices functioning in unison or individually. The device may be accompanied by a sound source in direct communication with the PCB or as a part of a separate sound source such as an external speaker.

In some embodiments, the PCB is in operable communication with a plurality of response elements, such as a plurality of lights, a plurality of speakers, a plurality of effectors. Effectors may include various motile elements such as actuators, vibrators, or other means of providing motion to the interactive luminary device or housing.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. An interactive luminary device comprising:
    a housing including at least one interactive luminary device comprising a semispherical flexible membrane;
    a compound lens system including a plurality of convex and concave lens surfaces arranged along an optical axis; and
    a plurality of sensors in operable communication with the at least one interactive luminary device, each sensor in communication with a programmable logic controller configured to analyze an input stimulus provided by a user and generate a plurality of response stimuli comprising illumination of the semispherical flexible membrane outer surface with colors and patterns according to a refraction pattern resultant from the plurality of convex and concave lens surfaces arranged along the optical axis of the compound lens system,
    wherein the flexible membrane outer surface further comprises a diffused viewing surface arranged on the outer surface and a flexible membrane protrusion configured as an annular ring about the perimeter of the semispherical flexible membrane, and the semispherical flexible membrane is hermetically sealed to the housing.

2. The device of claim 1, wherein the plurality of visual response stimuli further comprise at least one of the following:
    a changed, distorted, animated or altered visual stimulus, via at least one display system;
    wherein the at least one display system is disposed within an inner cavity formed between the flexible membrane and the housing.

3. The device of claim 1, wherein the response stimuli further comprise:

an audio stimulus, via at least one speaker;
a vibration, via at least one vibrator; or
a movement, via at least one effector.

4. The device of claim 1, wherein the at least one interactive luminary device comprises a pressure sensor and a pressure sensor tube.

5. The device of claim 1, wherein the plurality of sensors comprise a pressure sensor disposed within the flexible membrane to monitor pressure changes within the flexible membrane, wherein a change in pressure generates, via the programmable logic controller, an output signal to generate at least one response stimulus.

6. The device of claim 1, wherein the programmable logic controller is provided with a plurality of pre-programmed sequences comprising:
receiving a stimulus via the sensors comprising a movement, sound, vibration, touch, or other similar manipulation of the device or environment;
generating an output signal which results in a response stimulus for the user to see, feel, hear, or otherwise experience.

7. The device of claim 6, wherein the preprogrammed response stimulus sequence for the user to see comprises a pattern, a light intensity, a timing element, or a plurality of colors.

8. An interactive luminary system comprising:
a housing including at least one interactive luminary device comprising a flexible membrane having a diffused viewing surface on the outer surface and a flexible membrane protrusion configured about the perimeter of the flexible membrane,
a compound lens system including a plurality of convex and concave lens surfaces arranged along an optical axis;
a plurality of sensors in operable communication with the at least one interactive luminary device, each sensor in communication with a programmable logic controller provided with instructions to perform the following:
receiving a stimulus from the plurality of sensors comprising;
transmitting an output signal, via the programmable logic controller;
characterizing the output signal, via the programmable logic controller; and
generating a response stimulus and displaying the response stimulus via at least one display system,
according to a refraction pattern resultant from the plurality of convex and concave lens surfaces arranged along the optical axis of the compound lens system,
the at least one display system disposed within an inner cavity formed between the flexible membrane and the housing, and
the flexible membrane is hermetically sealed to the housing.

9. The system of claim 8, wherein the interactive luminary device is at least partially embedded into the housing.

10. The system of claim 9, wherein the at least one interactive luminary device hermetically sealed to the housing provides an interactive surface for the user.

11. The system of claim 8, wherein the response stimulus is provided as at least one of the following:
a visual stimulus, via the at least one display system;
an audio stimulus, via at least one speaker;
a vibration, via at least one vibrator; or
a movement, via at least one effector, actuator or other motile element.

12. The system of claim 11, wherein the visual stimulus is displayed on a translucent surface positioned on the housing or the at least one interactive element, wherein the interactive element is configurable in a geometric shape and removably engageable such that the interactive element is changed, replaced, or modulated as deemed to be used or entertained by the user.

13. The system of claim 12, wherein a pressure sensor is disposed within the hermetically sealed flexible membrane to monitor pressure changes, wherein a change in pressure generates, via the programmable logic controller, the output signal to generate the response stimulus.

14. The system of claim 8, wherein the programmable logic controller is provided with a plurality of pre-programmed sequences comprising:
receiving a stimulus via the sensors comprising a movement, sound, vibration, touch, or other similar manipulation of the device or environment;
generating an output signal which results in a response stimulus for the user to see, feel, hear, or otherwise experience.

15. The system of claim 14, wherein the preprogrammed response stimulus sequence for the user to see comprises a pattern, a light intensity, a timing element, or a plurality of colors.

16. An interactive luminary system comprising:
a housing including at least one interactive luminary device comprising a flexible membrane having a diffused viewing surface on the outer surface and a flexible membrane protrusion configured about the perimeter of the flexible membrane in communication with the housing; and
a compound lens system including a plurality of convex and concave lens surfaces arranged along an optical axis;
a plurality of sensors in operable communication with the at least one interactive luminary device, each sensor in communication with a programmable logic controller including instructions to perform the following:
receiving a stimulus from a user via the plurality of sensors;
transmitting an output signal to the programmable logic controller to permit the programmable logic controller to characterize the output signal; and
generating a response stimulus and transmitting the response stimulus to at least one display system or at least one interactive device, and at least one speaker, the at least one display system and at least one speaker disposed on the housing,
wherein the interactive device is configurable in a geometric shape and removably engageable such that the interactive element is changed, replaced, or modulated as deemed to be used or entertained by the user, and the flexible membrane is hermetically sealed to the housing.

17. The system of claim 16, wherein a plurality of response stimuli are stored in a memory in communication with the programmable logic controller.

18. The system of claim 17, wherein the plurality of response stimuli includes a plurality of preprogrammed sequence including a pattern, a light intensity, a timing element, or a plurality of colors.

19. The system of claim 18, wherein the interactive luminary device is disposed within an interior cavity of the housing.

20. The system of claim 19, wherein the housing is at least partially transparent to permit the emission of light therethrough.

\* \* \* \* \*